United States Patent [19]

Sharma

[11] Patent Number: 5,204,022
[45] Date of Patent: Apr. 20, 1993

[54] SOLID-FORM ADDITIVE SYSTEMS DISPERSIBLE IN AQUEOUS MEDIA

[75] Inventor: Mahendra K. Sharma, Kingsport, Tenn.

[73] Assignee: Eastman Kodak Company, Rochester, N.Y.

[21] Appl. No.: 392,759

[22] Filed: Aug. 11, 1989

[51] Int. Cl.$^5$ .................... B01F 3/00; B01F 17/00; C09K 3/00
[52] U.S. Cl. ................... 252/363.5; 106/499; 106/504
[58] Field of Search ............. 427/212; 523/333, 334, 523/307, 335, 336, 337, ; 524/312, 284, 81, 291, 800, 801, 379; 8/904, 905, 906; 252/49, 326, 315.2, 351, 363.5, 610; 106/504, .203, 499, 208, 278

[56] References Cited

U.S. PATENT DOCUMENTS

| | | | |
|---|---|---|---|
| 3,876,391 | 4/1975 | McCoy et al. | 252/309 X |
| 3,962,123 | 6/1976 | DiBattista et al. | 524/158 X |
| 4,040,996 | 8/1977 | Van Vonno | 260/23 |
| 4,385,901 | 5/1982 | Podder | 8/527 |
| 4,591,609 | 5/1986 | Kubo et al. | 523/336 |
| 4,619,705 | 10/1986 | Dixon et al. | 106/484 X |
| 4,670,181 | 6/1987 | Mollinger et al. | 252/186.25 |
| 4,775,713 | 10/1988 | Homma et al. | 524/517 |
| 4,960,814 | 10/1990 | Wu et al. | 524/312 |

FOREIGN PATENT DOCUMENTS 200684 11/1986 European Pat. Off. .
56-021815 2/1981 Japan .
86/04909 2/1986 PCT Int'l Appl. .

OTHER PUBLICATIONS

*Emulsions*: Theory and Practice, American Chemical Society Monograph Series, by Paul Becher, pp. 189-208 (Reinhold Publishing Corp., NY, 1957).
"The HLB System: A Time-saving Guide to Emulsifier Selection", a publication of ICI Americas Inc., pp. 18-19.

*Primary Examiner*—George F. Lesmes
*Assistant Examiner*—Christopher Brown
*Attorney, Agent, or Firm*—Mark A. Montgomery; William P. Heath, Jr.; S. E. Reiter

[57] ABSTRACT

Solid form additive systems which are dispersible in aqueous media are disclosed, as are methods for preparing such additive systems and methods for dispersing such additive systems in aqueous media. Also disclosed are methods for applying additives to polymeric particles and the polymeric particles treated by such methods.

47 Claims, No Drawings

SOLID-FORM ADDITIVE SYSTEMS DISPERSIBLE IN AQUEOUS MEDIA

DESCRIPTION

This invention relates to solid form additive systems which are dispersible in aqueous media. In one aspect, the present invention relates to the preparation of such additive systems. In another aspect, the present invention relates to methods of applying additives to polymeric particles. In a further aspect, the present invention relates to polymeric particles treated by such methods.

BACKGROUND

Known methods of introducing additives to polymeric particles include dry blending the materials, melting, and compounding the melted blend with extruders and pelletizing or powdering to the desired physical form. The additives employed to treat polymeric particles include antioxidants, processing aids, slip agents, antiblocking agents, antistatic agents, lubricants, UV stabilizers, coupling agents and colorants.

Another method of introducing additives to polymeric particles is to contact such particles with additive at the extruder hopper during end use processing. Additives such as colorants, slip agents, processing aids, blowing agents, and others are introduced to virgin polymeric particles at this stage usually in concentrate form. In many instances, difficulty is encountered in metering the exact amounts of additive concentrate necessary to do a specific job. This is especially true for additives such as processing aids and external lubricants which are used at very low levels and usually cannot be added in a concentrate form.

Some polymers are presently being manufactured with technology that does not lend itself to such techniques as melt compounding and pelletizing. Many polymers such as high density polyethylene, linear low density polyethylene, and polypropylene emerge from the polymerization reactor in a dry granular form, i.e., in a form similar to that of a fluidized bed system. Presently, additives for these polymers must be introduced by melting, compounding, and then pelletizing. This extra step increases the cost of such polymer manufacturing operations and can adversely affect the properties of such polymers.

Another method of coating polymeric particles with additives is disclosed in Japanese Patent 56-021815, issued to Tokoyama Soda. This patent teaches contacting polypropylene granules with a dispersion of additives in a solvent, followed by removal of the solvent. While some stabilization is thereby imparted to the coated polypropylene granules, the treated pellets have severe static electricity problems when subsequently processed, such as for example, by extrusion.

It would be desirable to have available a simple process for applying additives to polymeric particles in order to enhance the stability of the particles without adversely affecting the physical properties and processability of the treated particles. Typical additives employed for treating polymeric particles have been applied using organic solvents since such additives are typically insoluble in water. Due to the ever increasing cost of organic solvents, the high cost of solvent recovery systems, as well as the toxicity and explosive nature of organic solvents, plus the strict air-quality controls imposed by federal regulations, there is a great deal of motivation for users of polymer additives to switch to water as the solvent of choice for applying such additives to polymeric particles.

Yet another prior art process for the application of additives to polymeric particles involves the preparation of aqueous emulsions of additives, as disclosed, for example, in Patent Cooperation Treaty Document WO 86/04909. This process also discloses coating of polymeric particles by employing an aqueous emulsion or dispersion of additives, such as antioxidants, thermal stabilizing agents, colorants, and the like. These aqueous emulsions or dispersions can be applied by spray, wipe, dip systems, or the like to coat the polymeric particles before their normal drying or degassing operations.

While the latter application system represents an advance in the state of the art by replacing the need for organic solvents with aqueous-based application systems, the main disadvantage of this aqueous application system is that it contains substantial quantities of water, which requires special handling and shipping of the aqueous emulsions or dispersions. For example, these emulsions or dispersions tend to freeze when exposed to extremely cold temperatures. Unfortunately, merely heating the frozen emulsion or suspension does not always result in the re-formation of stable emulsions or dispersions. Thus, exposure to temperature extremes and long term storage can cause problems in processing these aqueous emulsions or dispersions when it is attempted to apply these additive systems to polymer particles.

In order to overcome the above-described limitations of the prior art, it would be desirable to prepare additive systems for the treatment of polymer particles wherein the additive systems can be handled in solid form, yet are readily water dispersible to produce aqueous application systems useful for the treatment of polymer particles.

SUMMARY OF THE INVENTION

In accordance with the present invention, a wide range of additives, such as antioxidants, thermal stabilizers, colorants, or the like, can be rendered water dispersible. Additional additives contemplated for use in the practice of the present invention include lubricants, mold release agents, antistatic agents, and the like. The invention water dispersible additive systems are easily handled because of their solid, typically free-flowing form. Once needed, the invention water dispersible additive systems can be readily dispersed in water to produce an aqueous emulsion or dispersion which can be used to coat polymeric particles before the normal drying or degassing operations employed in the normal polymer preparation and treatment environment. Coating of polymeric particles can be accomplished employing a variety of techniques, e.g., employing spray, wipe or dip systems.

The invention water dispersible additive systems can be formulated for treating a wide variety of polymeric materials which can then be formed into articles made from such polymer particles. The resulting particles can be used in a wide range of applications, e.g., as film or packaging for food, medicine, and the like.

Polymers which emerge from the polymerization reactor in particle form would substantially benefit from the application of such aqueous emulsions containing antioxidants and other additives by means of such an aqueous treatment. This means of introducing additives would eliminate melt compounding, lower production energy requirements, and minimize heat history on the polymer particles.

DETAILED DESCRIPTION OF THE INVENTION

In accordance with the present invention, there is provided a method for rendering one or more meltable polymer additives and, optionally, one or more higher melting polymer additives, dispersible in aqueous media, said method comprising:
a) heating said additives to a temperature sufficient to produce a melt phase,
b) combining the resulting melt phase, at a temperature sufficient to maintain a melt phase, with at least one surfactant having a low hydrophobic-lipophobic balance value and at least one surfactant having a high hydrophobic-lipophobic balance value, wherein said combining is carried out under sufficient agitation to provide a homogeneous mixed melt, and
c) allowing the resulting blend obtained from step (b) to cool so as to obtain a water dispersible solid material.

In accordance with another embodiment of the present invention, there is provided a method for rendering one or more meltable polymer additives and, optionally, one or more higher melting polymer additives, dispersible in aqueous media containing at least one surfactant having a high hydrophobic-lipophobic balance value, said method comprising:
a) heating said additives to a temperature sufficient to produce a melt phase of at least the lowest melting of said additives,
b) combining the resulting melt phase, at a temperature sufficient to maintain a melt phase, with at least one surfactant having a low hydrophobic-lipophobic balance value, wherein said combining is carried out under sufficient agitation to provide a homogeneous mixed melt, and
c) allowing the resulting blend obtained from step (b) to cool so as to obtain a water dispersible solid material.

In accordance with yet another embodiment of the present invention, there is provided a composition of matter dispersible in aqueous medium, said composition comprising:
i) one or more water insoluble, meltable polymer additives and, optionally, one or more higher melting, water insoluble polymer additives, wherein substantially all of said polymer additives have a particle size of less than about 40 microns, and
ii) at least one low hydrophobic-lipophobic balance value surfactant, wherein said surfactant is adsorbed on the surface of said water insoluble polymer additive particles.

In accordance with still another embodiment of the present invention, there is provided a process for dispersing water insoluble polymer additives in aqueous medium by adding the above-described compositions to aqueous media under conditions of agitation and for a time sufficient to wet the composition with water.

In accordance with a further embodiment of the present invention, there is provided a method of applying additives to polymeric particles comprising contacting such particles with the above-described aqueous emulsion or dispersion and drying the resulting particles.

In accordance with a still further embodiment of the present invention, there are provided stabilized polymer particles treated by the above-described method.

The additives employed in the practice of the present invention may be selected from antioxidants, e.g., tetrakis[methylene 3-(3',5'-di-tert-butyl-4',-hydroxyphenyl)-propionate]methane, octadecyl 3-(3',5'-di-t-butyl-4-hydroxyphenyl)propionate, 1,3,5-trimethyl-2,4,6-tris-(3,5-di-tert-butyl)-4-(hydroxybenzyl)benzene, bis(2,4-di-t-butyl-phenyl) pentaerythritol diphosphite, tris(mono nonylphenyl)phosphite, 4,4'-butylidene-bis(5-methyl-2-t-butyl)phenol, tris (3,5-di-t-butyl-4-hydroxybenzyl)isocyanurate, tris-nonylphenyl phosphite; distearyl pentaerythritol diphosphite; tetrakis-(2,4-di-t-butylphenyl)-4,4'-biphenylylene-diphosphonite; tris(2,3-di-t-butylphenyl) phosphite; butylated hydroxy toluene; dicetyl thiodipropionate; dimyristyl thiodipropionate; poly(1,4-cyclohexylenedimethylene-3,3'-thiodipropionate (partially terminated with stearyl alcohol); and the like; coupling agents, e.g., silanes; titanates; chromium complexes; low molecular weight polyolefins (with carboxylic moieties); high molecular weight polyolefins and acrylates (with carboxylic moieties); chlorinated paraffins; and the like; antistatic agents, e.g., glycerol monostearates; ethyoxylated amines; polyethylene glycol; quarternary ammonium compounds (salts); and the like; nucleating agents, e.g., sodium benzoate; diphenyl phosphinic acid (including magnesium, sodium, calcium, aluminum salts); phenyl phosphinic acid (including salts); phenyl phosphorous acid (including salts); and the like; metal deactivators, e.g., oxalyl bis(benzylidene, hydrazide); 2,2'-oxamido bis-(ethyl 3-(3,5-di-t-butyl-4-hydroxyphenyl)propionate; and the like; lubricants/slip agents/antiblocking agents, e.g., diatomaceous silica (earth); talc; clay; metallic stearates; alkyl bis-stearamids; glycerol monostearates; polyethylene glycol; erucamid; oleamid, and the like; UV inhibitors, e.g., 2-hydroxy-4-octoxybenzophenone; 2-hydroxy-4-isooctoxybenzophenone; 4-hydroxy-4-n-dodecyloxybenzophenone; 2-(3-di-t-butyl-2-hydroxy-5-methylphenyl-5-chlorobenzotriazole; 2-(2-hydroxy-3,5-di-t-amylphenyl) benzotriazole; p-t-butylphenyl salicylate; 2,4-di-t-butylphenyl-3,5-di-t-butyl-4-hydroxybenzoate; nickel bis-ortho-ethyl(3,5-di-t-butyl-4-hydroxybenzyl)phosphonate; 2,2',6,6'-tetramethyl-4-piperidinyl sebacate, and the like; flame retardants, e.g., decabromodiphenyl oxide; dodecachlorodimethane dibenzocyclooctane; ethylene bis-dibromo norbornane dicarboximide; ethylene bis-tetrabromophthalimide; antimony trioxide, and the like; biocides, e.g., methyl paraben, ethyl paraben, propyl paraben, halogenated alkyl organic compounds, transition metal carbamate salts, and the like; as well as mixtures of any two or more of the above mentioned classes of compounds, or mixtures of two or more compounds from within a given class of compound.

The emulsifiable wax contemplated for use in the practice of the present invention may be any wax which can be readily emulsified, for example, emulsifiable polyolefin waxes such as oxidized polyolefin waxes or modified polyolefin waxes. Preferred oxidized polyolefin waxes include waxes having a density in the range of about 0.92–0.96, melt viscosities in the range of about 50–4,000 cp at 125° C. and an acid number in the range of about 12–55. Exemplary waxes include an oxidized polyethylene wax having a density of 0.939, a melt viscosity of 250 cp at 125° C. and an acid number of 16; an oxidized polyethylene wax having a density of 0.942, a melt viscosity of 900 cp at 125° C. and an acid number of 15; an oxidized polyethylene wax having a density of 0.955, a melt viscosity of 250 cp at 125° C. and an acid number of 16; and a maleated polypropylene wax having a density of 0.934, a melt viscosity of 400 cp at 190° C. and an acid number of 47.

The aqueous emulsions/dispersions prepared in accordance with the present invention may contain a variety of emulsifiable waxes, e.g., an emulsifiable polyethylene wax having a density of 0.939, a melt viscosity of 250 cp at 125° C. and an acid number of 16. Such emulsions may also contain surfactants and emulsifiers such as commercially available Tergitol 15-S-15 [an ethoxylated linear alcohol having a hydrophilic-lipophilic balance of 15.4, as determined according to Griffin, W. C., Office, Dig. Federation Paint Varnish Prod. Blubs, 28 446 (1956)], and anti-foam agents such as SWS-211 (a mixture of food grade emulsifiers, 10% by wt silicone compounds, and water). Such emulsions may also contain potassium hydroxide, sodium tetraborate, sodium carbonate, sodium bicarbonate, calcium carbonate or magnesium carbonate, morpholine, 2-amino-2-methylpropanol, tall oil fatty acid, ethylene glycol and ethoxylated stearyl alcohol [commercially available as *Industrol A*99], and the like.

Temperatures sufficient to produce a melt phase, as contemplated by the invention method, can vary widely. Since many different additives can be processed in accordance with the present invention, a melt phase can be obtained with some additives at temperatures as low as about 30° C., with some additives requiring temperatures of about 250° C. or higher in order to yield a melt phase. Preferably, temperatures employed to produce a melt phase from the combination of additives will fall in the range of about 50° up to 200° C.

Of the polymer additives contemplated for use in the practice of the present invention, those referred to as "meltable polymer additives" are those which melt without substantial levels of degradation to produce a melt phase having a melt viscosity in the range of about 1-1000 cp when subjected to temperatures sufficient to produce a melt phase. Preferred meltable polymer additives are those which produce a melt phase having a melt viscosity in the range of 1-500 cp when heated to temperatures sufficient to produce a melt phase.

Higher melting polymer additives contemplated for use in the practice of the present invention are materials which require elevated temperatures to melt or which suffer from substantial levels of degradation upon exposure to elevated temperatures. Such additives are also characterized by their ability to be dispersed or dissolved in the melt phase produced by the meltable polymer additive.

The hydrophobic-lipophobic balance of a surfactant is an expression of the balance of the size and strength of the hydrophilic (polar) and the lipophilic (non-polar) groups of the surfactant.

As used herein, the term "low hydrophobic-lipophobic balance value surfactants" refers to surfactants having a hydrophobic-lipophobic balance value less than about 9, while the term "high hydrophobic-lipophobic balance value surfactant" refers to surfactant having a hydrophobic-lipophobic balance value of greater than about 9. Preferably, low hydrophobic-lipophobic balance value surfactant employed in the practice of the present invention will have a hydrophobic-lipophobic balance value falling in the range of about 2 up to 8, while preferred high hydrophobic-lipophobic balance value surfactants employed in the practice of the present invention will have a hydrophobic-lipophobic balance value of at least about 10.

Hydrophobic-lipophobic balance values can be determined in a variety of ways. For example, hydrophobic-lipophobic balance numbers for certain types of nonionic agents, such as polyoxyethylene derivatives of fatty alcohols and polyhydric alcohol fatty acid esters, including those of polyglycols, can be calculated with the aid of the following equation:

$$HLB = 20\left(1 - \frac{S}{A}\right)$$

where S is the saponification number of the ester and A is the acid number of the acid. Thus, for a glyceryl monostearate with S=161 and A=198, this equation gives a hydrophobic-lipophobic balance value for this material of 3.8.

For other surfactants such as esters of tall oil and rosin, bees wax, lanolin, and the like, hydrophobic-lipophobic balance values can be calculated from the equation:

$$HLB = \frac{E + P}{S}$$

where E is the weight percentage of oxyethylene content and P is the weight percentage of the polyhydric alcohol content.

While the above formulas are satisfactory for many surfactants, the hydrophobic-lipophobic balance values for many surfactants must be estimated by experimental methods. The experimental method of hydrophobic-lipophobic balance value determination entails blending the unknown surfactant in varying ratios with a surfactant having a known hydrophobic-lipophobic balance value, then using the blend to emulsify an oil for which the hydrophobic-lipophobic balance required to emulsify the oil (the "required HLB") is known. The blend which performs the best is deemed to have a hydrophobic-lipophobic balance value approximately equal to the required HLB of the oil, so that the hydrophobic-lipophobic balance value for the unknown material can be calculated.

A rough approximation of the hydrophobic-lipophobic balance value for a range of surfactants can be obtained by evaluation of the water solubility of the particular surfactant as summarized in the following table:

| Behavior When Added to Water | |
|---|---|
| | HLB Range |
| No dispersibility in water | 1–4 |
| Poor dispersion | 3–6 |
| Milky dispersion after vigorous agitation | 6–8 |
| Stable milky dispersion (upper end almost translucent) | 8–10 |
| From translucent to clear dispersion | 10–13 |
| Clear solution | 13+ |

Exemplary low hydrophobic-lipophobic balance value surfactants contemplated for use in the practice of the present invention include:
mono- and diglycerides,
sorbitan fatty acid esters,
polyoxyethylene sorbitol esters,
polyoxyethylene alcohols, ethoxylated alkylphenols,
ethoxylated alcohols,
polyalkylene glycol ethers,
phosphated mono- and diglycerides,
citric acid esters of monoglycerides,
diacetylated tartaric acid esters of monoglycerides,
glycerol monooleate,
sodium stearoyl lactylates,
calcium stearoyl lactylates,
phospholipids, or
phosphatidyl ethanolamine,
as well as mixtures of any two or more thereof.

Exemplary high hydrophobic-lipophobic balance value surfactants contemplated for use in the practice of the present invention include:
glycerol monostearate,
polyoxyethylene sorbitan fatty acid esters,
polyethylene sorbitol esters,
polyoxyethylene acids,
polyoxyethylene alcohols,
polyoxyethylene alkyl amines,
alkyl aryl sulfonates, or
ethoxylated alkylphenols,
as well as mixtures of any two or more thereof.

The amount of surfactant employed in the practice of the present invention can vary widely. Typically, the total amount of surfactants employed will fall in the range of about 0.5 up to 50 wt %, based on the total weight of the final composition; with the total amount of surfactants falling in the range of about 1 up to wt % being preferred.

The weight ratio of low hydrophobic-lipophobic balance value surfactants to high hydrophobic-lipophobic balance value surfactants employed in the practice of the present invention can vary widely. Typically, the weight ratio of low-hydrophobic-lipophobic balance value surfactant to high hydrophobic-lipophobic balance value surfactant will fall in the range of about 0.1 up to 10:1; with weight ratios in the range of about 0.5 up to 2:1 being preferred.

The components of the invention composition can be combined in most any convenient manner. Thus, all components can be combined, then heated to produce a melt, or the meltable component can be heated alone, followed by addition of the other components, and so on. It is presently preferred that all additives contemplated for a given composition be combined and melted, then the low hydrophobic-lipophobic balance value surfactant(s) added, followed by addition of the high hydrophobic-lipophobic balance value surfactant(s).

Agitation of the melt phase is desirable to aid production of a substantially homogeneous melt. Agitation can be provided by any suitable means, such as mechanical stirring, shaking, and the like.

The combination is maintained under melt conditions and agitated for a time sufficient to produce a substantially homogeneous melt phase.

When the melt phase is to be cooled, it is only necessary to cool the melt phase to the extent that the melt phase substantially solidifies to produce a solid material which is amenable to further handling, such as crushing, grinding, packaging, and the like.

When the solid material initially formed from the melt phase is subjected to the optional comminution step, this can be accomplished by a variety of techniques, as are well known to those of skill in the art, e.g., use of a ball mill, hammer mill, colloid mill, and the like.

The invention compositions are readily dispersed in aqueous media, typically by adding up to 50 wt % of polymer additive(s) to aqueous media, and agitating sufficiently to promote contact between the particles of additive and the aqueous media. Any suitable means to promote such contacting is acceptable for the desired agitation.

Depending on factors such as the particle size of the additive(s) to be dispersed, the temperature of the aqueous media, the quantity of additive(s), the quantity (and ratio) of high and low hydrophobic-lipophobic value surfactants, and the like, the contact time required for dispersion of additive(s) can be as short as a few minutes up to 3 hours or longer. Preferably, under typical operating conditions, it will take in the range of about 0.1 up to 1 hour for complete dispersion of the additive(s).

The invention compositions can be dispersed in aqueous media in large quantities. Thus, loading of up to about 50 wt % solids in aqueous media are contemplated. Preferred loading levels fall in the range of about 5 up to 25 wt %, based on the total weight of polymer additive(s) and low hydrophobic-lipophobic balance value surfactant. Since it is frequently added separately to the aqueous media, the quantity of high hydrophobic-lipophobic balance value is indicated separately to vary in the range of about 0.1 up to 10 wt %, with quantities in the range of about 0.1 up to 1 wt % being preferred.

The above-described aqueous emulsions or dispersions are useful, for example, for applying numerous polymer additives, either alone or in combination, to a wide range of polymer particles. This is readily accomplished by contacting the polymer particles with the above described aqueous emulsion or dispersion, e.g., by spraying the dispersion on the polymer particles, mixing polymer particles with the aqueous dispersion, and the like.

Some preferred polymeric particles include, for example, polyolefins such as crystalline polypropylene, low density polyethylene, high density polyethylene and linear low density polyethylenes. Other polymeric materials include, for example, polystyrene, polyesters, polyamides and the like as well as copolymers such as crystalline propylene ethylene copolymers, rubbers such as ethylene propylene rubber and the like.

The present invention provides polymeric particles which are stabilized in the above-mentioned unique and efficient manner.

The invention will now be described in greater detail with reference to the following non-limiting examples.

EXAMPLES

Example 1

This example illustrates the preparation of water-dispersible Irganox ® 1076 used as a thermal stabilizer and antioxidant for polymeric particles employing the process of this invention. Irganox ® 1076 is chemically known as octadecyl 3-(3',5'-di-tert-butyl-4'-hydroxyphenyl)propionate or octadecyl 3,5-di-tert-butyl-4-hydroxyhydrocinnamate, and supplied by Ciba-Geigy. The surfactants used are ethoxylated alkylphenols commercially known as Igepal ® surfactants from GAF Corporation. An aqueous-dispersible material contains the following ingredients.

| Ingredients | Amount (g) | (%) |
|---|---|---|
| Irganox ® 1076 | 100 | 93.9 |
| Igepal ® CO-210 | 2.75 | 2.6 |
| Igepal ® CO-630 | 3.75 | 3.5 |

The following procedure was used for converting water-insoluble Irganox ® 1076 to water-dispersible form.

1. Heat Irganox ® 1076 in a glass container at 60° C. using water bath. The melted material was stirred to obtain the homogeneous melt phase.
2. Add to the melt phase a low HLB surfactant (e.g., Igepal ® CO-210). The surfactant was mixed completely by stirring device.
3. Add to the melt phase (Step 2) a high HLB value surfactant (e.g., Igepal ® CO-630). The surfactant was completely mixed in the melt phase using stirring device.
4. Cool the melt phase at room temperature. On cooling, melted ingredients convert to the solid form.
5. The solid material was crushed or ground to obtain a powder form.

Example 2

This example illustrates the preparation of an aqueous suspension using powder obtained from the process of the present invention. An aqueous-dispersible material prepared in accordance with Example 1 was employed for preparing an aqueous suspension. 20 g of crushed material is dispersed in 80 g of $H_2O$ using magnetic stirrer. Stable suspensions were prepared which remain dispersed in water for several weeks. Typical particle size of these dispersions is:

| % Relative Volume | Particle size μm |
|---|---|
| 10 | 8.95 |
| 50 | 18.90 |
| 90 | 33.09 |

The particle size of the additive dispersion is large enough to promote settling in water. However, no settling was observed for several days, which may be due to the low density of the dispersed material (which has a density very close to that of water), and the proper selection of the surfactants.

Example 3

Example 1 is repeated in detail with the exception that the Irganox ® 1076 is replaced with Epolene ® E-14 wax. Epolene ® E-14 is an oxidized low molecular weight polyethylene wax supplied by Eastman Kodak Company. The composition of the ingredients used to convert Epolene ® E-14 wax from water-insoluble to water-dispersible form is as follows:

| Ingredients | Amount (g) | (%) |
|---|---|---|
| Epolene ® E-14 Wax | 50 | 93.8 |
| Igepal ® CO-210 | 1.4 | 2.6 |
| Igepal ® CO-630 | 1.9 | 3.6 |

The heating temperature used for Epolene ® E-14 wax was 140° C. The ground material prepared employing the process of this invention is water-dispersible. The dispersions were prepared in accordance with Example 2. Typical particle size of this aqueous dispersion is:

| % Relative Volume | Particle size μm |
|---|---|
| 10 | 3.61 |
| 50 | 9.12 |
| 90 | 20.12 |

Example 4

This example illustrates the preparation of water-dispersible additives containing several water-insoluble materials employed in stabilizing polymeric particles. The aqueous-dispersible additives contain the following ingredients:

| Ingredients | Amount (g) | (%) |
|---|---|---|
| Irganox ® 1076 | 200 | 63.2 |
| Epolene ® E-14 | 40 | 12.6 |
| Calcium Stearate | 63.5 | 20.1 |
| Igepal ® CO-210 | 5.5 | 1.7 |
| Igepal ® CO-630 | 7.5 | 2.4 |

All ingredients (e.g., Irganox ® 1076, Epolene ® E-14 and calcium stearate) except surfactants were placed in a beaker. Using water-bath, ingredients were mixed in the melted Irganox ® 1076 at 85° C. After complete mixing, Igepal ® CO-210 and Igepal ® CO-630 were added to the melted Irganox ® 1076 containing calcium stearate and Epolene ® E-14 at 85° C. The material was removed from water-bath and cooled at room temperature. At room temperature, the material is obtained in solid form. The material is ground in order to achieve a fine powder, which is water-dispersible. The aqueous-dispersions were prepared as described in Example 2. The dispersions were stable and did not settle for several weeks. The particle size of the dispersed material is as follows:

| % Relative Volume | Particle size μm |
|---|---|
| 10 | 3.86 |
| 50 | 10.28 |
| 90 | 25.76 |

Example 5

The water-dispersible additives prepared in accordance with Example 4 were employed to stabilize polymeric particles. Aqueous dispersions containing 25% by weight additives (Example 4) were prepared. The dispersions were further diluted with water to obtain 6.25% additives by weight.

40 g of diluted aqueous-dispersion was applied to 500 g of polypropylene pellets having a density of 0.902 and a melt flow rate of 9. The amount of dispersion used was calculated to achieve the solid level of 0.5% solids by weight on the coated polypropylene pellets. The polypropylene pellets were placed in an oven for 15 min at 60°–85° C. before starting coating. The pellets should be warm in order to achieve good adhesion of solid dispersions employed for coating. The coated polypropylene did not exhibit a color shift when placed in an oven for 72 hrs at a temperature of 150° C. The desired ingredients can be included in the coating formulation either in the process of making water-dispersible additives or at the time of preparing dispersions from material prepared employing process described in this invention.

Example 6

Example 5 was repeated with the exception that the polypropylene pellets were coated with Epolene ® E-14 emulsion formulation as described in patent application Ser. No. 197,946 filed May 24, 1988. The amount of active material used for coating was the same, and the exception in coating process was that the pellets were placed for 15 min at 60° C. before applying coating material prepared by the process of this invention, while pellets were coated without heating with Epolene ® E-14 emulsions. The coated polypropylene pellets were compared. Results demonstrated that both the formulations protect the pellets and did not change color when placed in an air-forced oven for 72 hrs at 150° C.

Example 7

Examples 5 and 6 were repeated with the exception that the amount of diluted aqueous dispersions contained 1.5 g solids instead of 2.5 g in coating formulations for polymeric particles. The coating conditions for applying material of the present invention were identical as outlined in Example 5, whereas for Epolene ® E-14 emulsion, the coating conditions were identical as described in Example 6.

40 g of diluted aqueous dispersions containing 1.5 g solid were applied to 500 g of polypropylene pellets having a density of 0.902 and a melt flow rate of 9. The amount of dispersion used was calculated to achieve the solid level of 0.3% solids by weight on the coated pellets. The coated polypropylene pellets were placed in an air-forced oven at a temperature of 150° C. These pellets turned brown in a period of 24 hrs, which suggests that the amount applied on pellets was not sufficient to protect the polymeric particles.

Example 8

Example 4 was repeated with the exception that the Epolene ® E-14 was not included in preparing water-dispersible additives employing process of this invention. The composition of the ingredients is as follows:

| Ingredients | Amount (g) | (%) |
|---|---|---|
| Irganox ® 1076 | 100 | 72.3 |
| Calcium Stearate | 31.8 | 23.0 |
| Igepal ® CO-210 | 2.8 | 2.0 |
| Igepal ® CO-630 | 3.8 | 2.7 |

Irganox ® 1076 and calcium stearate were placed in a glass container and heated using water-bath at a temperature of 75° C. The materials were completely mixed with a glass rod. The calcium stearate was dispersed in the melted Irganox ® 1076 at 75° C. To this dispersion, Igepal ® CO-210 and Igepal ® CO-630 were added and mixed completely. After 10 min, the container was removed from water-bath and left for cooling at room temperature. A solid was obtained and converted into powder form by the grinding process.

The aqueous dispersions were prepared by adding 20 g water-dispersible additives, prepared using process of the present invention, to 80 g water. The aqueous dispersions were stable and did not settle for several weeks. The particle size and size distribution of the dispersion are as follows:

| % Relative Volume | Particle size, μm |
|---|---|
| 10 | 4.36 |
| 50 | 11.64 |
| 90 | 28.09 |

Example 9

Example 5 was repeated with the exception that the water-dispersible additives of Example 8 were employed in coating polymeric particles instead of material of Example 4. For coating polypropylene pellets, 10 g aqueous dispersions of Example 8 were diluted with 30 g water. The diluted dispersions contained 5% solid in water. The 40 g diluted dispersing containing 2 g solid were applied to 500 g polypropylene pellets having a density of 0.902 and a melt flow rate of 9. The amount of dispersion used was calculated to achieve the solid level of 0.4% solids by weight on the coated pellets. The coated polypropylene pellets did not exhibit a color change when placed in an air-forced oven for 3 days at a temperature of 150° C. This example demonstrates that the active ingredients can be coated on polymeric particles without Epolene ® E-14 in the formulation.

Example 10

This example illustrates the proper selection of the surfactants needed to convert water-insoluble additives to water-dispersible form. The composition of the aqueous-dispersible powder is as follows:

| Ingredients | Amount (g) | (%) |
|---|---|---|
| Irganox ® 1076 | 100.0 | 65.4 |
| Calcium Stearate | 31.8 | 20.8 |
| Epolene ® E-14 | 20.0 | 13.1 |
| Igepal ® CO-210 | 1.0 | 0.7 |

The procedure of preparing water-dispersible powder is the same as described in Example 4 except that the ingredients were melted at a temperature of 60° C.

20 g powder prepared according to the process of this invention was dispersed in 80 g water containing 0.5 g Igepal ® CO-630 surfactant using stirring device. The aqueous dispersions were unstable and were separated in two distinct phases. This indicates the need of a proper surfactant or a mixture of surfactants for making water-dispersible additives.

Example 11

Example 10 was repeated with the exception that the amount of Igepal ®; CO-210 used was 1.5 g instead of 1.0 g in preparing the water-dispersible additives, which have the following composition:

| Ingredients | Amount (g) | (%) |
|---|---|---|
| Irganox ® 1076 | 100.0 | 65.2 |
| Calcium Stearate | 31.8 | 20.7 |
| Epolene ® E-14 | 20.0 | 13.1 |
| Igepal ® CO-210 | 1.5 | 1.0 |

The aqueous dispersions were prepared exactly as described in Example 10. The dispersions were unstable and were separated into two distinct phases.

Example 12

Example 10 was repeated with the exception that the amount of Igepal ® CO-210 used was 2.0 g instead of 1.0 g in preparing the water-dispersible additives. Resultant powder was dispersed exactly as described in Example 10. The dispersions were unstable and were separated into two distinct phases.

Example 13

Example 10 was repeated with the exception that the amount of Igepal ® CO-210 used was 2.5 g instead of 1.0 g in preparing the water-dispersible additives. The composition of the water-dispersible powder is as follows:

| Ingredients | Amount (g) | (%) |
|---|---|---|
| Irganox ® 1076 | 100.0 | 64.8 |
| Calcium Stearate | 31.8 | 20.6 |
| Epolene ® E-14 | 20.0 | 13.0 |
| Igepal ® CO-210 | 2.5 | 1.6 |

Resultant powder was dispersed exactly in accordance with Example 10. The aqueous dispersions were stable and did not settle, even after several weeks. This example demonstrates the importance of the surfactant concentration required to prepare water-dispersible powder for stabilizing polymeric particles.

Example 14

This example demonstrates the importance of the process of this invention. The ingredients of Example 4. without employing process of this invention were dispersed in water. The composition of the ingredients is as follows:

| Ingredients | Amount (g) | (%) |
|---|---|---|
| Irganox ® 1076 | 20.0 | 62.9 |
| Epolene ® E-14 | 4.0 | 12.6 |
| Calcium Stearate | 6.4 | 20.1 |
| Igepal ® CO-210 | 0.6 | 1.9 |
| Igepal ® CO-630 | 0.8 | 2.5 |

The ingredients (30.4 g) were dispersed in 150 g water containing 0.6 g Igepal ® CO-210 and 0.8 g Igepal ® CO-630. These ingredients were separated in distinct phases. In order to prepare water-dispersible additives, the ingredients should be processed as described in this invention.

Example 15

Example 4 was repeated with the exception that Tergitol ® 15-S-7 and Tergitol ® 15-S-15 were used instead of Igepal ® CO-210 and Igepal ® CO-30 in converting water-insoluble additives to water-dispersible form in accordance with the process of this invention. Tergitol ® 15-S-7 and Tergitol ® 15-S-15 are the polyethylene glycol ether of linear alcohols and are available from Union Carbide Corporation. The composition of an aqueous-dispersible powder is as follows:

| Ingredients | Amount (g) | (%) |
|---|---|---|
| Irganox ® 1076 | 75 | 63 |
| Epolene ® E-14 | 15 | 12.6 |
| Calcium Stearate | 24 | 20.1 |
| Tergitol ® 15-S-7 | 2.1 | 1.8 |
| Tergitol ® 15-S-15 | 3.0 | 2.5 |

All ingredients except Tergitol ® 15-S-7 and Tergitol ® 15-S-15 were placed in a beaker. These ingredients were melted using water-bath at 65° C. After complete mixing, Tergitol ® 15-S-7 and Tergitol ® 15-S-15' were added to the melted ingredients at 65° C. The melted ingredients were left for 10 min at 65° C. after incorporating surfactants to the melt. The melted material was removed from water-bath and cooled at room temperature. At room temperature, solid ingredients were obtained, which can be converted to the fine powder by grinding process.

20 g powder prepared employing this process was dispersed in 80 g water using magnetic stirrer. The powder settled slightly on standing for a few hours. This indicates that the amount of the two surfactants used should be optimized in order to eliminate the observed settling in the aqueous-dispersions.

The invention has been described in detail with particular reference to preferred embodiments thereof, but it will be understood that variations and modifications can be effected within the spirit and scope of the invention.

I claim:

1. A method for rendering one or more meltable polymer additives and, optionally, one or more higher melting polymer additives, dispersible in aqueous media, said method comprising:
   a) heating said additives to a temperature sufficient to produce a melt phase,
   b) combining the resulting melt phase, at a temperature sufficient to maintain a melt phase, with at least one surfactant having a low hydrophobic-lipophobic balance value of less than about 9 and at least one surfactant having a high hydrophobic-lipophobic balance value of greater than about 9, wherein said combining is carried out under sufficient agitation to provide a homogeneous mixed melt, and
   c) allowing the resulting blend obtained from step (b) to cool so as to obtain a water dispersible solid material.

2. A method in accordance with claim 1 further comprising:
   d) comminuting the resulting solid material into a finely divided form.

3. A method in accordance with claim 1 wherein said polymer additives are selected from the group comprising
   thermal stabilizing agents,
   processing aids,
   colorants,
   antistatic agents,
   coupling agents,
   UV stabilizers,
   metal deactivators,
   nucleating agents, or
   flame retardants,
as well as mixtures of any two or more thereof.

4. A method in accordance with claim 3 wherein said thermal stabilizing agent is an antioxidant and is selected from:
tetrakis[methylene 3-(3',5'-di-tert-butyl-4,-hydroxyphenyl)-propionate]methane,
octadecyl 3-(3,,5,-di-tert-butyl-4-hydroxyphenyl)propionate,
1,3,5-trimethyl-2,4,6-tris-(3,5-di-tert-butyl)-4-(hydroxybenzyl)benzene,
bis(2,4-di-tert-butyl-phenyl)pentaerythritol diphosphite,
tris(monononylphenyl)phosphite, 4,4'-butylidene-bis(5-methyl-2-tert-butyl)-phenol,
tris(3,5-di-tert-butyl-4-hydroxybenzyl)-isocyanurate,
tris-nonylphenyl phosphite,
distearyl pentaerythritol diphosphite,
tetrakis-(2,4-di-tert-butylphenyl)-4,4'-biphenylene diphosphonite,
tris-(2,3-di-tert-butylphenyl)phosphite,
butylated hydroxy toluene,
dicetyl thiodipropionate,
dimyristyl thiodipropionate, or
poly(1,4-cyclohexylene-3,3'-thiodipropionate, partially terminated with stearyl alcohol,
as well as mixtures of any two or more thereof.

5. A method in accordance with claim 3 wherein said processing aids are selected from talc, clay, diatomaceous earth, metallic stearates, alkyl bis-stearamides, glycerol monostearates, polyethylene glycol, erucamid, or oleamid, as well as mixtures of any two or more thereof.

6. A method in accordance with claim 3 wherein said colorants are selected from:
poly(ethylene terephthalate) copolymerized with 1,5-bis[(3-hydroxy-2,2'-dimethylpropyl)amino]anthraquinone,
poly(neopentylene terephthalate) copolymerized with 2,2'-(9,10-dihydro9,10-dioxo-1,5-anthracenediyl)diimino)bis-benzoic acid, or
poly(neopentylene naphthalene-2,6-dicarboxylate) copolymerized with 1,5-bis[(3-hydroxy-2,2-dimethylpropyl)amino]anthraquinone.

7. A method in accordance with claim 3 wherein said antistatic agents are selected from glycerol monostearates, ethoxylated amines, polyethylene glycols, or quaternary ammonium compounds, as well as mixtures of any two or more thereof.

8. A method in accordance with claim 3 wherein said coupling agents are selected from silanes, titanates, chromium complexes, carboxyl-substituted polyolefins, carboxyl-substituted acrylates, or chlorinated paraffins, as well as mixtures of any two or more thereof.

9. A method in accordance with claim 3 wherein said UV stabilizers are selected from:
2-hydroxy-4-octoxybenzophenone,
2-hydroxy-4-isooctoxy-benzophenone,
4-hydroxy-4-n-dodecycloxybenzophenone,
2-(3-di-tert-butyl-2-hydroxy-5-methylphenyl-5-chlorobenzyltriazole,
2-(2-hydroxy-3,5-di-tert-amylphenyl)benzotriazole,
para-tert-butylphenyl salicylate,
2,4-di-tert-butylphenyl-3,5-di-tert-butyl-4-hydroxybenzoate,
nickel bis-ortho-ethyl(3,5-di-tert-butyl -4-hydroxybenzyl) phosphonate, or
2,2',6,6'-tetramethyl-4-piperidinyl sebacate, as well as mixtures of any two or more thereof.

10. A method in accordance with claim 3 wherein said flame retardant is selected from:
decabromodiphenyl oxide,
dodecachlorodimethane dibenzocyclooctane,
ethylene bis-dibromo norbornane dicarboxamide,
ethylene bis-tetrabromophthalimide, or
antimony trioxide,
as well as mixtures of any two or more thereof.

11. A method in accordance with claim 3 wherein said metal deactivating agent is selected from:
oxalyl bis-(benzylidene hydrazide), or
2,2'-oxamido bis-(ethyl 3-(3,5-di-tert-butyl-4-hydroxyphenyl) propionate,
as well as mixtures of any two or more thereof.

12. A method in accordance with claim 3 wherein said nucleating agent is selected from sodium benzoate, diphenyl phophinic acid, the magnesium, sodium, calcium, or aluminum salts of diphenyl phosphinc acid, phenyl phosphinic acid, the magnesium, sodium, calcium, or aluminum slats of phenyl phosphinic acid, phenyl phosphorous acid, or the magnesium, sodium, calcium, or aluminum salts of phenyl phosphorous acid, as well as mixtures of any two or more thereof.

13. A method in accordance with claim 1 wherein said surfactant having a low hydrophobic-lipophobic balance value has a hydrophobic-lipophobic balance value which falls in the range of about 2 up to 8.

14. A method in accordance with claim 13 wherein said surfactant having a low hydrophobic-lipophobic balance value is selected from the group comprising:
mono- and diglycerides,
sorbitan fatty acid esters,
polyoxyethylene sorbitol esters,
poloxyethylene alcohols,
ethoxylated alkylphenols,
ethoxylated alcohols,
polyalkylene glycol ethers,
phosphated mono- and diglycerides,
citric acid esters of monoglycerides,
diacetylated tartaric acid esters of monoglycerides,
glycerol monooleate,
sodium stearoyl lactylates,
calcium stearoyl lactylates,
phospholipids, or
phosphatidyl ethanolamine,
as well as mixtures of any two or more thereof.

15. A method in accordance with claim 1 wherein said surfactant having a high hydrophobic-lipophobic balance value has a hydrophobic-lipophobic balance value of at least 10.

16. A method in accordance with claim 15 wherein said surfactant having a high hydrophobic-lipophobic balance value is selected from the group comprising:
glycerol monosterate,
poloxyethylene sorbitan fatty acid esters,
poolyethylene sorbitol esters,
polyoxyethylene acids,
polyoxyethylene alcohols,
polyoxyethylene alkyl amines,
alkyl aryl sulfoantes, or
ethoxylated alkylphenols,
as well as mixtures of any two or more thereof.

17. A method in accordance with claim 1 wherein the total amount of surfactants falls in the range of about 0.5 up to 50 wt. %, based on the total weight of final composition.

18. A method in accordance with claim 1 wherein the total amount of surfactants falls in the range of about 1 up to 10 wt %, based on the total weight of final composition.

19. A method in accordance with claim 17 wherein the weight ratio of surfactant having a low hydrophobic-lipophobic balance value to surfactant having a high hydrophobic-lipophobic balance value falls in the range of about 0.1 up to 10.

20. A method in accordance with claim 18 wherein the weight ratio of surfactant having a low hydrophobic-lipophobic balance value to surfactant having a high hydrophobic-lipophobic balance value falls in the range of about 0.5 up to 2.

21. A method in accordance with claim 1 wherein the temperature employed for step (a) is sufficient to melt at least the lowest melting of said additives.

22. A method in accordance with claim 21 wherein the temperature employed for step (a). is about 5 up to 20° C. above the melting point of the lowest melting polymer additive present in the combination.

23. A method in accordance with claim 1 wherein the at least one surfactant having a low hydrophobic-lipophobic balance value is added to the melt phase in the step (b) combining prior to adding at least one surfactant having a high hydrophobic-lipophobic balance value to the melt phase.

24. A method in accordance with claim 1 wherein, substantially all of said polymer additives have a particle size of less than about 40 microns.

25. A method for rendering one or more meltable polymer additives and, optionally, one or more higher melting polymer additives, dispersible in aqueous media containing at least one surfactant having a high hydrophobic-lipophobic balance value of greater than about 9, said method comprising:
   a) heating said additives to a temperature sufficient to produce a melt phase of at lest the lowest melting of said additives,
   b) combining the resulting melt phase, at a temperature sufficient to maintain a melt phase, with at least one surfactant having a low hydrophobic-lipophobic balance value of less than about 9, wherein said combining is carried out under sufficient agitation to provide a homogeneous mixed melt, and
   c) allowing the resulting blend obtained from step (b) to cool so as to obtain a water dispersible solid material.

26. A method in accordance with claim 25 further comprising:
   d) comminuting the resulting solid material into a finely divided form.

27. A method in accordance with claim 25 wherein said polymer additives are selected from the group comprising:
   thermal stabilizing agents,
   processing aids,
   colorants,
   antistatic agents,
   coupling agents,
   UV stabilizers,
   metal deactivators,
   nucleating agents, or
   flame retardants,
as well as mixtures of any two or more thereof.

28. A method in accordance with claim 27 wherein said thermal stabilizing agent is an antioxidant and is selected from:

tetrakis[methylene 3-(3',5'-di-tert-butyl-4'-hydroxyphenyl)-propionate]methane,
octadecyl 3-(3,,5,-di-tert-butyl-4-hydroxyphenyl)propionate,
1,3,5-trimethyl-2,4,6-tris-(3,5-di-tert-butyl)-4-(hydroxybenzyl)benzene,
bis(2,4-di-tert-butyl-phenyl)pentaerythritol diphosphite,
tris(monononylphenyl)phosphite, 4,4'-butylidene-bis(5-methyl-2-tert-butyl)-phenol,
tris(3,5-di-tert-butyl-4-hydroxybenzyl)-isocyanurate,
tris-nonylphenyl phosphite,
distearyl pentaerythritol diphosphite,
tetrakis-(2,4-di-tert-butylphenyl)-4,4'-biphenylene diphosphonite,
tris-(2,3-di-tert-butylphenyl)phosphite,
butylated hydroxy toluene,
dicetyl thiodipropionate,
dimyristyl thiodipropionate, or
poly(1,4-cyclohexylene-3,3'-thiodipropionate, partially terminated with stearyl alcohol,
as well as mixtures of any two or more thereof.

29. A method in accordance with claim 27 wherein said processing aids are selected from talc, clay, diatomaceous earth, metallic stearates, alkyl bisstrearamides, glycerol monostearates, polyethylene glycol, erucamid, or oleamid, as well as mixtures of any two or more thereof.

30. A method in accordance with claim 27 wherein said colorants are selected from:
   poly(ethylene terephthalate) copolymerized with 1,5-bis[(3-hydroxy-2,2'-dimethyl-propyl)amino] anthraquinone,
   poly(neopentylene terephthalate) copolymerized with 2,2'-(9,10-dihydro-9,10-dioxo-1,5-anthracenediyl)diimino) bis-benzoic acid, or
poly(neopentylene naphthalene-2,6-dicarboxylate) copolyemerized with 1,5-bis[(3-hydroxy-2,2-dimethylpropyl)amino]anthraquinone.

31. A method in accordance with claim 27 wherein said antistatic agents are selected from glycerol monostearates, ethoxylated amines, polyethylene glycols, or quaternary ammonium compounds, as well as mixtures of any two or more thereof.

32. A method in accordance with claim 27 wherein said coupling agents are selected from silanes, titanates, chrominum, complexes, carboxyl-substituted polyolefins, carboxyl-substituted acrylates, or chlorinated paraffins, as well as mixtures of any two or more thereof.

33. A method in accordance with claim 27 wherein said UV stabilizes are selected from:
   2hydroxy-4-octoxybenzophenone,
   2-hydroxy-4-isooctoxy-benzophenone,
   4-hydroxy-4-n-dodecycloxybenzophenone,
   2-(3-di-tert-butyl-2-hydroxy-5-methylphenyl-5- chlorobenzyltriazole,
   2-(2-hydroxy-3,5-di-tert-amylphenyl) benzotriazole,
   para-tert-butylphenyl salicylate,
   2,4-di-tert-butylphenyl-3,5-di-tert-butyl-4-hydroxybenzoate,
   nickel bis-ortho-ethyl(3,5-di-tert-butyl-4-hydroxybenzyl) phosphonate, or
   2,2', 6,6'-tetramethyl-4-piperidinyl sebacate,
as well as mixtures of any two or more thereof.

34. A method in accordance with claim 27 wherein said flame retardant is selected from:
   decabromodiphenyl oxide,
   dodecachlorodimethane dibenzocyclooctane, ethylene bis-dibromo norbornane dicarboxiamide,
ethylene bis-tetrabromophthalimide, or antimony trioxide, as well as mixtures of any two or more thereof.

35. A method in accordance with claim 27 wherein said metal deactiating agent is selected from:
    oxalyl bix-(benzylidene hydrazide), or
    2,2'-oxamido bis-(ethyl 3-(3,5-di-tert-butyl-4-hydroxyphenyl) propionate,
as well as mixtures of any two or more thereof.

36. A method in accordance with claim 27 wherein said nucleating agent is selected from sodium benzoate, diphenyl phosphinic acid, the magnesium, sodium, calcium, or aluminum salts or diphenyl phosphinic aicd, phenyl phosphinic acid, the magnesium, sodium, calcium, or aluminum salts of phenyl phosphinci acid, phenyl phosphorous acid, or the magnesium, sodium, calcium, or aluminum salts of phenyl phosphorous acid, as well as mixtures of any two or more thereof.

37. A method in accordance with claim 25 wherein said surfactant having a low hydrophobic-lipophobic balance value has a hydrophobic-lipophobic balance value which falls in the range of about 2 up to 8.

38. A method in accordance with claim 37, wherein said surfactants having a low hydrophobic-lipophobic balance value is selected from the group comprising:
    mono- and diglycerides,
    sorbitan fatty acid esters,
    polyoxyethylene sorbitol esters,
    polyoxyethylene alcohols,
    ethoxylated alkylphenols,
    ethoxylated alcohols,
    polyalkylene glycol ethers,
    phosphated mono- and diglycerides,
    citric acid esters of monoglycerides,
    diacetylated tartaric acid esters of monoglycerides,
    glycerol monooleate,
    sodium stearoyl lactylates,
    calcium stearoyl lactylates,
    phospholipids, or
    phosphatidyl ethanolamine,
as well as mixtures of any two or more thereof.

39. A method in accordance with claim 25 wherein said surfactant having a high hydrophobic-lipophobic balance value has a hydrophobic-lipophobic balance value of at least 10.

40. A method in accordance with claim 39 wherein said surfactant having a high hydrophobic-lipophobic balance value is selected from the group comprising:
    glycerol monostearate,
    polyoxyethylene sorbitan fatty acid esters,
    polyethylene sorbitol esters,
    polyoxyethylene acids,
    polyoxyethylene alcohols,
    polyoxyethylene alkyl amines,
    alkyl aryl sulfonates, or
    ethoxylated alkylphenols,
as well as mixtures of any two or more thereof.

41. A method in accordance with claim 25 wherein the total amount of surfactants falls in the range of about 0.5 up to 50 wt %, based on the total weight of final composition.

42. A method in accordance with claim 25 wherein the total amount of surfactants falls in the range of about 1 up to 10 wt %, based on the total weight of final composition.

43. A method in accordance with claim 41 wherein the weight ratio of surfactant having a low hydrophobic-lipophobic balance value to surfactant having a high hydrophobic-lipophobic balance value falls in the range of about 0.1 up to 10.

44. A method in accordance with claim 42 wherein the weight ratio of surfactant having a low hydrophobic-lipophobic balance value to surfactant having a high hydrophobic-lipophobic balance value falls in the range of about 0.5 up to 2.

45. A method in accordance with claim 25 wherein the temperature employed for step (a) is sufficient to melt at least the lowest melting of said additives.

46. A method in accordance with claim 45 wherein the temperature employed for step (a) is about 5° up to 20° C. above the melting point of the lowest melting polymer additive present in the combination.

47. A method in accordance with claim 25 wherein substantially all of said polymer additives have a particle size of less than about 40 microns.

* * * * *